No. 866,318. PATENTED SEPT. 17, 1907.
J. H. WILSON.
KETTLE COVER.
APPLICATION FILED AUG. 14, 1906.
2 SHEETS—SHEET 1.
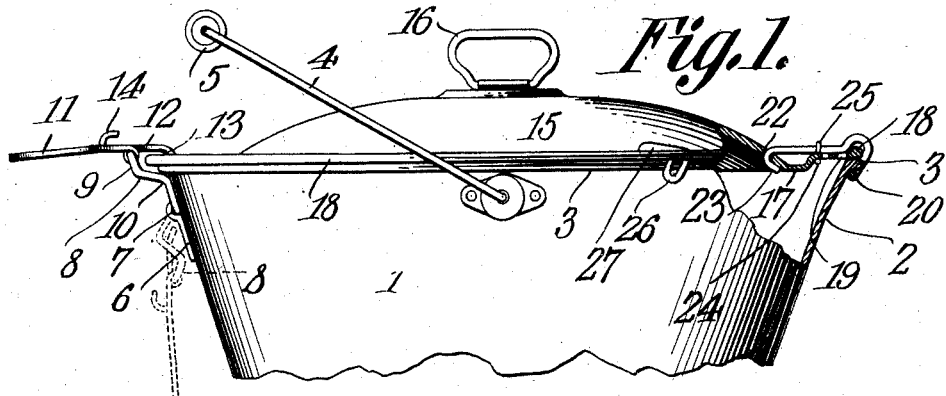
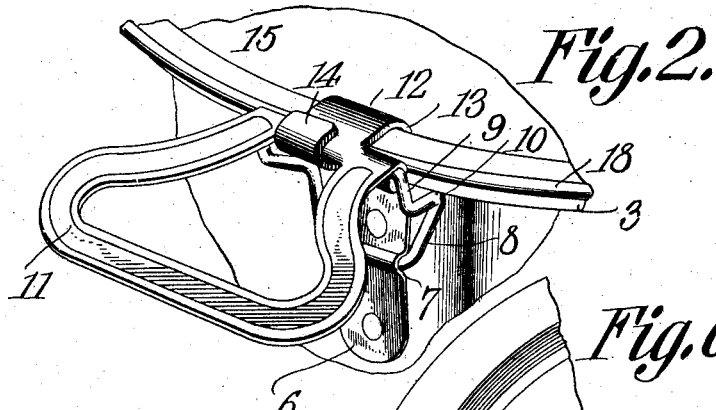
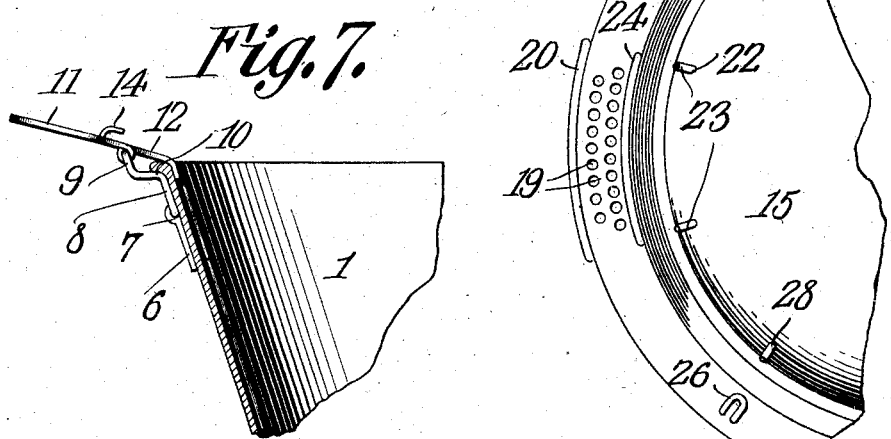
WITNESSES:
John H. Wilson,
INVENTOR.
By C. A. Snow & Co.
ATTORNEYS No. 866,318. PATENTED SEPT. 17, 1907.
J. H. WILSON.
KETTLE COVER.
APPLICATION FILED AUG. 14, 1906.
2 SHEETS—SHEET 2.
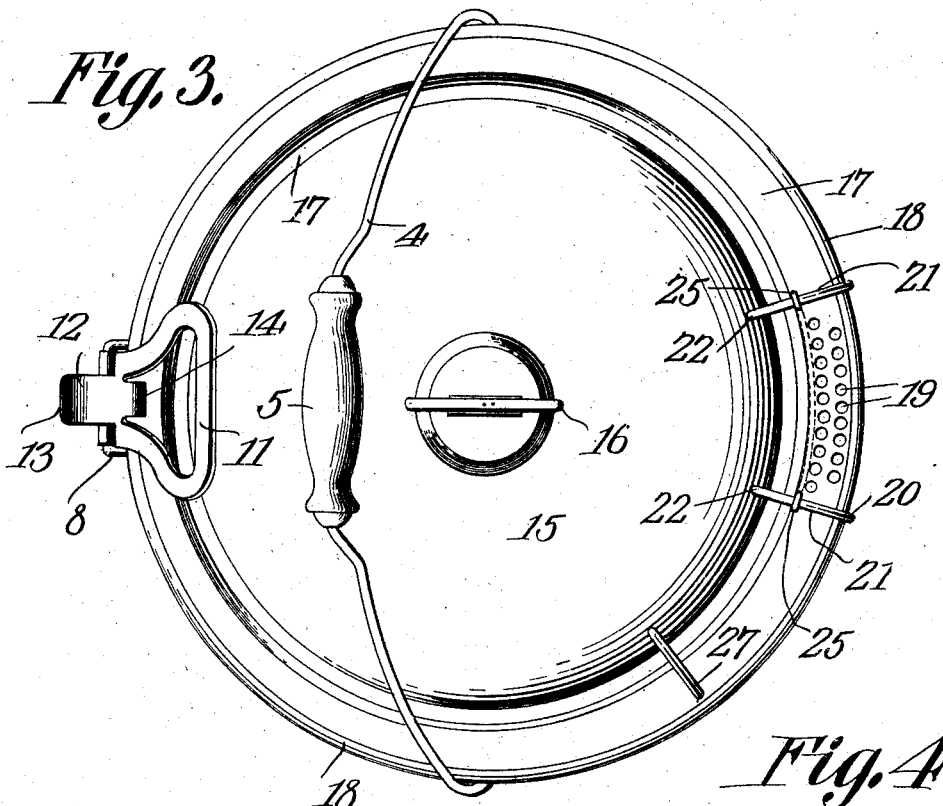
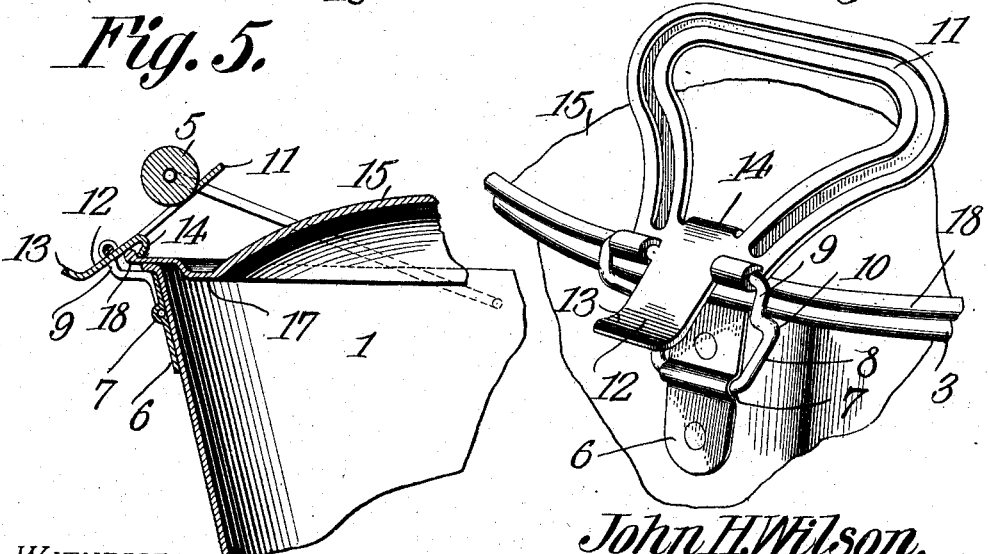
John H. Wilson,
INVENTOR.
By C. A. Snow & Co.
ATTORNEYS
WITNESSES:

UNITED STATES PATENT OFFICE.

JOHN H. WILSON, OF NEW KENSINGTON, PENNSYLVANIA, ASSIGNOR TO THE ALUMINUM COOKING UTENSIL CO., OF PITTSBURG, PENNSYLVANIA.

KETTLE-COVER.

No. 866,318.  Specification of Letters Patent.  Patented Sept. 17, 1907.

Application filed August 14, 1906. Serial No. 330,569.

*To all whom it may concern:*

Be it known that I, JOHN H. WILSON, a citizen of the United States, residing at New Kensington, in the county of Westmoreland and State of Pennsylvania, have invented a new and useful Kettle-Cover, of which the following is a specification.

This invention relates to cooking vessels and more particularly to covers therefor and to means for fastening the covers in position.

The object of the invention is to provide a cover which can be utilized as a strainer and which has means for holding the same against rotation while being used as a strainer so that the perforated or strainer portion of the cover will remain in a predetermined position.

Another object of the invention is to provide a cover which can be so disposed as to prevent steam from escaping therefrom in undesirable quantities.

A still further object is to provide a novel form of holder for facilitating the manipulation of the vessel and for assisting in securing the cover upon the vessel in any of the positions which it may assume.

With these and other objects in view the invention consists of a vessel of any preferred proportions and having a spout adapted to be embraced by a loop which is secured in a novel manner to the apertured portion of a cover which is adapted to be seated on the vessel. A retaining bill is also connected to the cover and is utilized for the purpose of holding said cover in position when the same has been rotated so as to remove the loop from engagement with the spout. Disposed upon the vessel directly opposite the spout is a link of peculiar contour to which is connected a handle having a hook extending in one direction therefrom and a tongue extending in an opposite direction, said hook and tongue being adapted to coöperate with the cover and the body of the vessel for facilitating the manipulation of the vessel and also for coöperating with the loop and bill to lock the cover in position. The bail of the vessel is adapted to be sprung into engagement with the handle and interlock therewith and thereby fasten the cover upon the vessel.

The invention also consists of certain other novel features of construction and combinations of parts which will be hereinafter more fully described and pointed out in the claims.

In the accompanying drawings is shown the preferred form of the invention.

In said drawings: Figure 1 is a side elevation of a portion of a vessel having these improvements applied thereto, the normal position of the supplemental handle being shown by dotted lines and the spout and adjoining portion of the cover being shown in section; Fig. 2 is a perspective view of the rear portion of the vessel and showing the supplemental handle in the position shown in Fig. 1; Fig. 3 is a plan view of the vessel with the supplemental handle positioned and prior to being engaged by the bail; Fig. 4 is a perspective view of the supplemental handle in the position shown in Fig. 3; Fig. 5 is a section through the supplemental handle and the adjoining portions of the vessel and showing the bail in engagement therewith; Fig. 6 is a view of the lower face of the apertured portion of the cover; and Fig. 7 is a detail view showing the manner of placing the supplemental handle for the purpose of assisting in manipulating the vessel when the cover is removed.

Referring to the figures by characters of reference, 1 is a vessel of any suitable proportions and having a spout 2 the upper edge of said vessel being surrounded by a bead 3. A bail 4 is connected to opposite portions of the receptacle and is adapted to swing toward or away from the spout and has a grip 5 connected to the central portion thereof. A strap 6 is riveted or otherwise connected to the outer face of the vessel 1 directly opposite the spout 2 and has a transverse channel 7 formed therein in which is pivoted one end of a link 8. The upper portion of this link is offset as shown at 9 so that the shoulders 10 produced in this manner may bear against the vessel close to the bead 3 while the offset portion of the link will project over said bead and beyond the edge of the cover of the vessel. A looped handle 11 is pivoted upon the upper portion of the link 8 and has a tongue 12 formed integral therewith and extending beyond the fulcrum thereof, the end of said tongue being bent downward as shown at 13. A hook 14 extends upward from this supplemental handle close to the fulcrum thereof and is curved in the direction of the tongue 12. The loop of the handle 11 is sufficiently wide to receive the grip 5 therein if so desired.

The cover 15 of the receptacle is preferably formed with the usual ring 16 at the center thereof and has a circular channel 17 struck downward thereinto adjacent the periphery of the cover, said periphery being preferably reinforced by means of a bead 18. That portion of the cover between the periphery and the channel 17 is formed with a group of apertures 19 which, when the cover is in its normal position, are disposed directly above the spout 2. A curved loop 20 is suspended below the periphery of the cover adjacent these apertures and terminates in inwardly extending arms 21 which overlap the cover and project through openings 22 therein and are bent upward as shown at 23 so as to be firmly locked in position. A tight wire 24 is disposed upon the lower surface of the cover adjacent the apertures 19 and the ends thereof extend upward through the cover and are hooked over the arms 21 as shown at 25. Said arms are therefore held rigidly in place and the loop 20 can not easily be displaced. An inwardly inclined bill 26 is disposed upon the lower face of the cover at a point removed from the loop 20 and is formed by the hooked end of a heavy wire 27 the ends of said wires being extended through openings in the cover and the inner end of said wire being bent against the cover as shown at 28 thereby insuring the rigid connection of the wire with the cover.

As heretofore stated the normal position of the cover 15 is with the openings 19 above the spout 2 and the loop 20 in engagement with the bead of spout 2. When the cover is in this position the water in the vessel can be drained through the openings simply by inclining the vessel. When the vessel is being used in this manner the supplemental handle 11 is swung into the position shown in Figs. 1 and 2 and the inclined end of the tongue 12 will bear upon the outer wall of the channel 17 and draw the cover a short distance toward said supplemental handle thereby tightly binding the loop 20 upon the spout. If the operator grasps both the handle 11 and the grip 5 with the parts in this position the cover will be maintained upon the vessel and can not slip off while the water is being drained therefrom. Should it be desired to hold the cover in this position without having the openings 19 above the spout it is merely necessary to disengage the loop 20 from the spout and to partly rotate the cover until the bill 26 assumes a position close to the spout. This movement of the cover will bring the openings 19 to one side of the spout and beyond the wall of the vessel and that portion of the cover above the spout will be imperforate. Should it be desired to lock the cover on the vessel the supplemental handle is turned upon its pivot so as to bring the hook 14 into engagement with the bead 18 of the cover as shown in Figs. 3, 4 and 5 and the bail 4 is then swung toward the supplemental handle so that the grip 5 will spring into said handle as shown particularly in Fig. 5. The parts will thus be bound together and the cover will be securely fastened in place by the loop 20, bill 26 and the supplemental handle 11. If the cover is not in position on the vessel the tongue 12 can be swung into engagement with the edge of the vessel as shown in Fig. 7 and can be used in connection with the bail 4 for tilting the vessel. It will be seen that when the handle is not in use it hangs downward close to the vessel 1 and will not therefore interfere with the perfect nesting of the vessel during transportation or storage.

An important feature of the invention is the fact that the supplemental handle always assumes a position where the hand grasping it will not be contacted by steam escaping from under the cover 15. When the parts are in the positions shown in Fig. 5 the grip 5 is supported out of contact with the vessel and at a point where steam can not contact with it and therefore said grip as well as the handle 11 will remain comparatively cool and can be grasped without discomfort.

The preferred form of the invention has been set forth in the foregoing description but I do not limit myself thereto, as I am aware that modifications may be made therein without departing from the spirit or sacrificing the advantages thereof, and I therefore reserve the right to make such changes as fairly fall within the scope of the claims.

What is claimed is.

1. The combination with a receptacle having a spout; of a movable cover having a plurality of apertures adapted to be positioned above the spout, and a spout engaging loop concentric with and disposed below the cover, said loop having spaced inturned ends extending through and secured to the cover.

2. The combination with a receptacle having a spout; of a movable cover adapted to be positioned above the spout, a spout engaging loop concentric with and extending under the cover, said loop having hooked inturned ends engaging the cover, and integral looped means for securing said ends in engagement with the cover.

3. The combination with a receptacle having a spout; of a cover having an apertured portion adapted to be positioned above the spout, a spout engaging loop supported below the cover, arms integral therewith and extending through the cover, and a tie wire secured at its ends to the arms and extending under the cover.

4. The combination with a receptacle having a spout; of a cover having a plurality of apertures adapted to be positioned above the spout, a loop, supporting arms extending through the cover and integral with the loop, a tie wire, and hooks at the ends thereof extending through the cover and engaging the arm.

5. A vessel cover having a perforated portion, a loop supported adjacent said portion, arms extending from the ends of the loops and through openings in the cover, said arms being hooked, and a tie wire extending under the cover, the ends of said wire projecting through the cover and engaging the arms.

6. A vessel cover having a perforated portion, a loop extending from the lower face of said cover and adjacent the perforated portion, and an inwardly inclined bill extending from the lower face of the cover at a point removed from the loop.

7. A bucket having bails, one of which constitutes a cover holder, and means carried by said bails for holding them in interlocked relation to lock the cover closed.

8. A bucket having bails, means carried by the bails for holding them in interlocked relation, and a hook extending from and movable with one of the bails and disposed to engage and lock the cover when the bails are interlocked.

9. A bucket having bails, means carried by the bails for holding them in interlocked relation, a hook extending from and integral with one of the bails, and a cover engaging tongue extending from and integral with said bail, said hook being disposed to engage and lock the cover when the bails are interlocked.

10. The combination with a bucket and a removable cover thereon; of bails upon the bucket, means carried by the bails for holding them in interlocked relation, a device upon and integral with one of the bails disposed to engage and lock the cover when the bails are interlocked, and a pivoted link connection between said last mentioned bail and the bucket.

11. The combination with a bucket, a removable cover, and bucket engaging means upon the cover; of a link pivotally connected to the bucket, a bail pivotally mounted upon the link, a bail connected to the bucket, and means carried by the bails for holding them in interlocked relation, one of said bails being disposed to engage and lock the cover when the bails are interlocked.

12. The combination with a bucket, a cover, and a bucket engaging device carried by the cover; of a bail movably connected to the bucket at a point diametrically opposite that portion of the bucket engaged by the device upon the cover, a hook integral with said bail, a second bail, and means carried by the bails for holding them in interlocked relation and with the hook in engagement with the cover, said hook being disposed to engage and lock the cover when the bails are in interlocked relation.

13. The combination with a bucket, a cover, and a bucket engaging device carried by the cover; of a bail movably connected to the bucket at a point diametrically opposite that portion of the bucket engaged by the device upon the cover, a hook integral with said bail for engaging the cover to bind the bucket engaging device upon the bucket, a bucket engaging tongue integral with said bail, a second bail, and means carried by the bails for holding them in interlocked relation and with the hook in engagement with the cover, said hook being disposed to lock the cover against movement when the bails are interlocked.

14. A bucket having bails, one of which constitutes a cover holder, and means carried by one of the bails disposed to project into and engage the other bail to lock the cover.

15. A bucket having bails, one of which constitutes a cover holder having an aperture therein, and means carried by the other bail and disposed to be seated within the aperture to lock the bails together and secure the cover against movement.

In testimony that I claim the foregoing as my own, I have hereto affixed my signature in the presence of two witnesses.

JOHN H. WILSON.

Witnesses:
S. M. DUMM,
HARRY C. WALLEY.